described.

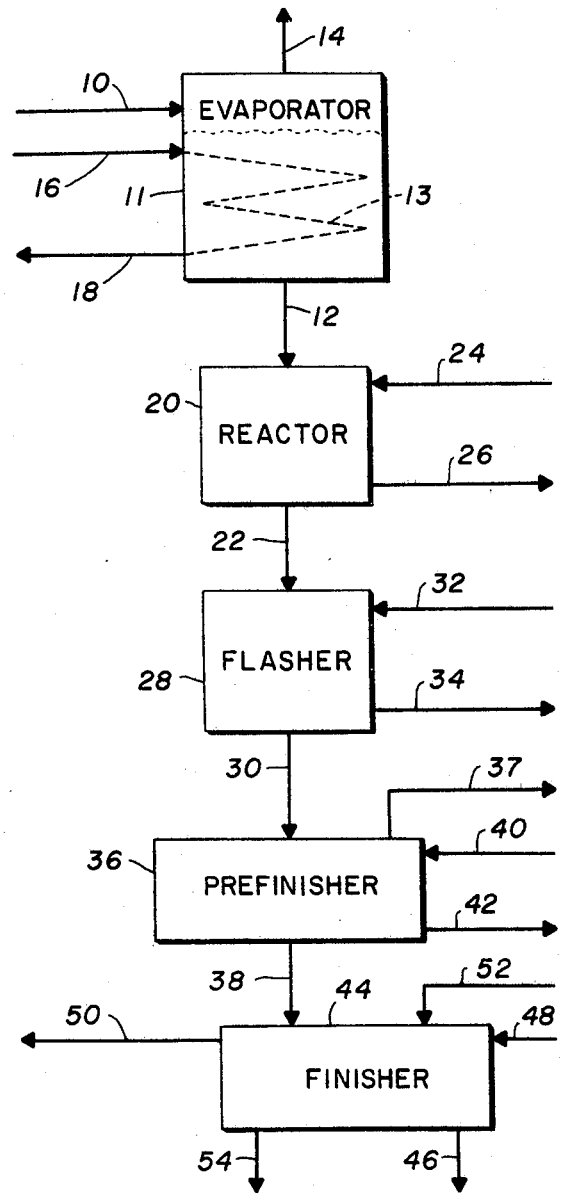

United States Patent Office 3,509,107
Patented Apr. 28, 1970

3,509,107
PROCESS FOR INCREASING POLYAMIDE VISCOSITY AND POLYAMIDE COMPOSITION PREPARED THEREBY
Edmond P. Brignac, Pensacola, Fla., assignor to Monsanto Company, St. Louis, Mo., a corporation of Delaware
Continuation-in-part of application Ser. No. 430,598, Feb. 5, 1965. This application Dec. 1, 1967, Ser. No. 687,308
Int. Cl. C08g 53/00
U.S. Cl. 260—78
8 Claims

ABSTRACT OF THE DISCLOSURE

In a process for preparing a fiber-forming polyamide in which molten polyamide is swept with inert gas to improve the relative viscosity of the polymeric product, the amount of inert gas required to effect a given polymer viscosity improvement can be substantially lowered and a polyamide of unexpectedly high viscosity can be obtained by carrying out the inert gas sweep in the presence of certain phosphorous compounds.

CROSS-REFERENCE TO RELATED APPLICATION

The application is a continuation-in-part of my copending application Ser. No. 430,598 which was filed on Feb. 5, 1965 and is now abandoned.

BACKGROUND OF THE INVENTION

Nylons are long-chain polyamides having recurring amide groups as an integral part of the main polymer chain. They can be formed into filaments in which the structural elements are oriented along the filament axis and which have many uses, e.g. in production of fibers for tire cords, textiles, etc. Examples of such filament-forming polyamides include nylon-66 (polyhexamethylene adipamide), nylon-6 (polymeric 6-amino caproic acid), nylon-610 (polyhexamethylene sebacamide), nylon-4, nylon-7, nylon-11, etc. and co-polymers thereof.

The average molecular weight or degree of polymerization of polyamides such as nylon is generally most conveniently measured in terms of relative viscosity (RV) which, as used herein, is intended to mean the ratio of the absolute viscosity (in centipoises) at 25° C. of an 11 weight percent solution of the polyamide in a 90 percent solution of formic acid in water to the absolute viscosity (in centipoises) at 25° C. of the 90 percent formic acid solution alone. In general, polyamides of high viscosity are desirable because of the improved properties of fibers made therefrom. For example, fiber made from polyamides of high RV have increased tensile strength, durability and impact resistance. These properties are very desirable, especially in fiber used as reinforcement for pneumatic automobile tires.

One method for increasing the RV of a polyamide is to drive the polycondensation reaction by lowering the pressure (e.g. by exerting a vacuum) on the molten polymer. However, that method has the disadvantage of tending to "puff" the polymer and thereby fill and sometimes flood the polymerization vessel. Also, the vacuum may cause air to enter the vessel through small cracks or around bearings, thus causing polymer discoloration.

Another method for markedly increasing viscosity consists of sweeping the molten polymer with inert gas. This method is more convenient than the use of a vacuum because of the aforementioned problems encountered in using a vacuum. However, the finishing of many polyamides to high relative viscosities (e.g. over 70 for use in tire yarn) requires high inert gas flow rates which tend to cause uneven finishing (i.e., a variation in the degree of polymerization throughout the polyamide) which results in non-uniform polymer and, after melt-spinning, polymeric filaments of poor quality. Also, inert gas is expensive and high inert gas flow rates are therefore costly. In the absence of a satisfactory method for operation at such high inert gas flow rates, a process by which the RV of a polyamide can be substantially increased with lower inert gas rates is highly desirable, and it is an object of this invention to provide such a process.

SUMMARY OF THE INVENTION

It has now been discovered that the relative viscosity improvement that is achieved by sweeping a molten polyamide with a given quantity of inert gas is substantially increased when the polyamide contains at least one phosphorous compound from the group defined hereinbelow. Moreover, the RV increase is substantially greater than the increases that would be obtained by separate use of the given amount of inert gas and the same amount of the phosphorous compound. Accordingly, the present invention provides a process for preparing a polyamide composition of unexpectedly high relative viscosity, which process comprises sweeping molten polyamide containing a phosphorous compound having the formula

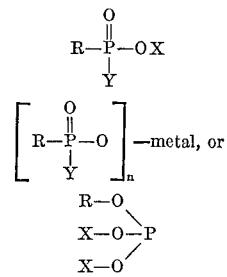

wherein

R is alkyl, cycloalkyl, aryl or arylalkyl,
Y is hydrogen, alkyl, cycloalkyl, aryl, arylalkyl or —OX,
X is hydrogen, alkyl, cycloalkyl, aryl or arylalkyl, and
$n$ is a whole number corresponding to the valence of the metal with sufficient inert gas to substantially increase the relative viscosity of the polyamide.

Also provided is the polyamide composition of unexpectedly high RV prepared by the process of this invention.

DESCRIPTION OF THE DRAWING AND SPECIFIC EMBODIMENTS OF THE INVENTION

The invention will be more readily understood by reference to the following detailed description taken in conjunction with the accompanying drawing which is a schematic flow diagram representing the preparation of a polyamide by a continuous system in which the process of this invention can be employed. Although the system shown in the drawing can be employed in polymerization of various polyamide-forming reactants including those mentioned hereinbefore, it is particularly useful in preparing polymers of adipic acid and hexamethylene diamine, and it is with reference to those specific polymers that the invention will be described hereinafter.

Referring now to the drawing, the system shown therein comprises an evaporator 11, a reactor 20, a flasher 28, a prefinisher 36 and a finisher 44. In operation, an aqueous solution of the salt of adipic acid and hexamethylene diamine is fed into evaporator 11 through line 10. The aqueous solution generally contains between 25 and 55 weight percent of hexamethylene diammonium adipate and may also contain certain additives depending upon the desired product properties. A typical mixture of additives includes a copper compound such as cupric acetate, a halogen compound such as potassium iodide and, in some cases, an aryl sulfonamide that is inert to the polyamide. An antifoaming agent is also generally added to the salt solution.

Evaporator 11 is usually operated at a pressure between atmospheric and 100 pounds per square inch gauge and at a temperature between 105° and 200° C. to evaporate enough water from the solution to raise its reactant concentration to at least about 60 weight percent. Heat is generally supplied to the evaporator by means of steam, Dowtherm vapor or the like entering a heating coil 13 through line 16 and exiting by way of line 18. Evaporated water is withdrawn from the evaporator through line 14 while the concentrated salt solution flows to reactor 20 by way of line 12. Reactor 20 is a heat exchange vessel such as a shell surrounding an internal reaction zone. Heat is supplied to the shell by means of steam, Dowtherm, or the like flowing through inlet line 24 and outlet line 26. The concentrated salt solution is normally subjected to a pressure of 150–300 pounds per square inch gauge and a temperature between 200° and 295° C. for between 30 minutes and 3 hours. After its residence time in the reactor, during which polymerization begins, the reaction mass flows through line 22 to flasher 28 in which the pressure is quickly reduced to about one atmosphere, permitting the evaporation of more water from the reaction mass to drive the polymerization reaction further. At the same time, heat is supplied to the flasher to replace that lost by evaporation, e.g. by a heating fluid such as steam, Dowtherm or the like conducted through flasher 28 via inlet line 32 and outlet line 34. The partially polymerized material in flasher 28 exits therefrom and passes to prefinisher 36 by way of line 30. In the prefinisher, the reaction mass is normally formed into one or more thin films to allow condensation by-products and the like to escape from the reaction mass and then exit from the prefinisher by way of line 37. Heat is supplied by way of a fluid heating medium flowing through prefinisher 36 via inlet line 40 and outlet line 42. The degree of polymerization is increased in the prefinisher so that a low molecular weight polyamide, usually having a relative viscosity of from about 4 up to about 25 emits from prefinisher 36 and flows by way of line 38 to polymer finisher 44 in which the process of this invention can be suitably carried out.

Polymer finisher 44 is a polymerization vessel of any conventional design such as a horizontal screw finisher. Although satisfactory operating pressures range from well below atmospheric (e.g. 5 p.s.i.a.) up to a pressure of several atmospheres, it is generally preferable to use a pressure of about one atmosphere or slightly above to prevent air from leaking in while inhibiting the reaction minimally. The temperature of the reaction mass in finisher 44 is generally between 260° and 300° C. and preferably between 280° and 290° C. Heat is supplied to finisher 44 by means of a heating fluid (e.g. Dowtherm) passed therethrough via inlet line 52 and outlet line 54. Polymer residence time in the finisher is generally between about 6 and about 90 minutes, after which it exits through line 46.

To assist in raising the polymer RV, the polyamide in finisher 44 is swept with a stream of inert gas which is preferably although not necessarily countercurrent to the polymer flow. In such countercurrent flow, the inert gas enters the finisher through line 48 and exits through line 50. The inert gas can be nitrogen, carbon dioxide, a rare gas such as helium or argon, or a mixture of two or more such gases. For economic reasons, nitrogen is usually preferred. By employing the inert gas sweep in finisher 44, polyamides of high RV (up to 70 or more when the polyamide is polyhexamethylene adipamide) can be produced in accordance with the process just described. However, as noted before, the required quantity of inert gas is directly related to the desired RV increase. In some cases, as much as 1.5 standard cubic feet (s.c.f.) of a gas such as nitrogen may be required to raise the RV of each pound of polyhexamethylene adipamide from about 25 to above 70. Lowering the inert gas rate to one s.c.f. per pound of polyhexamethylene adipamide under otherwise identical conditions typically results in a final RV of about 58.

In accordance with the present invention, it has been found that the presence of at least one of the aforementioned phosphorous compounds in the polyamide significantly lowers the amount of inert gas that is required to effect a given increase in the RV of the polyamide. Expressed otherwise, the presence of the phosphorous compound or compounds substantially raises the amount by which the polyamide RV is increased by sweeping with a given quantity of the inert gas. Specific examples of phosphorous compounds that can be used in carrying out the process of this invention include phenylphosphinic acid, diphenylphosphinic acid, sodium phenylphosphinate, calcium phenylphosphinate, potassium 3-pentylphosphinate, methylphosphinic acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, etc.

The phosphorous compound is preferably combined with the polyamide by inclusion in the aqueous salt solution prior to polymerization, although it can be added at any point in the polymerization process prior to the finishing step. In the system shown in the drawing, the partially polymerized polyamide entering finisher 44 preferably contains the phosphorous compound or compounds in the amount required to achieve the desired polymer RV increase with the inert gas rate to be used. In an alternative system in which a partially polymerized polyamide is extruded (e.g. in ribbon form) and then cooled and chopped into solid chips or flakes which are melted when desired for further polymerization, the phosphorous compound is preferably included prior to such extrusion and solidification so that a greater RV improvement can be obtained during the subsequent melting which is usually facilitated by sparging the melting polymer with an inert gas. Although any amount of the phosphorous compound is generally sufficient to provide some increase in the RV improvement that results from the inert gas sweep, concentrations between about 0.001 and about 3 percent of the phosphorous compound or compounds (based on the weight of the polyamide) are normally preferred and best results are usually obtained with a concentration between about 0.005 and 0.5 weight percent of the phosphorous compound or compounds.

When the process is carried out in the presence of such compounds, the amount of inert gas should be that which provides the desired polymer RV increase with the specific phosphorous compound concentration in use. Normally, a polyamide containing a concentration of phosphorous compound within the aforedescribed range is swept with from about 0.02 to about 2 standard cubic feet of the inert gas per pound of the polyamide. Under optimum conditions, polyamides of high RV (up to 70 or higher) can be obtained with the use of from about 0.1 to about 0.5 s.c.f. of inert gas per pound of a polyamide that contains between about 0.05 and 0.2 weight percent of the phosphorous compound. The sweeping of the polyamide with the inert gas can be carried out by any method that provides sufficient contact (preferably intimate contact) between the polyamide and inert gas to substantially increase the RV of the polyamide. Thus, a stream of the inert gas can be conducted along the surface of a pool or stream of the molten polymer. Preferably, the pool or stream is shallow or thin and/or agitated to provide more thorough contact between the gas and polymer, e.g. as in finisher 44. Alternatively, the inert gas can be conducted through a pool or stream of the molten polymer, e.g. by sparging the polymer with a stream of the inert gas. In some cases, sparging provides a very desirable method of maximizing the thoroughness of the gas-polymer contact and is therefore a preferred method of sweeping the polyamide in such cases.

Because of the additional and unexpectedly large RV increases achieved by the process of this invention, the polyamide product and filaments, fibers and yarn produced therewith have significantly better properties than polyamides and products of polyamides that did not include a phosphorous compound during the inert gas sweep but which were otherwise produced in like manner. For example, the fibers are whiter and have greater light-stability, increased tenacity, greater breaking strength, improved rubber adhesion and greater resistance to depolymerization. When yarn produced from a polyamide prepared by the process of this invention is made into tire cord and the cord is then used for pneumatic tire reinforcement, the life span of the tire is markedly increased over that of tires reinforced with cord made from polyamides that contained no phosphorous compound but were otherwise identically prepared.

The following examples are included to demonstrate the advantages of the process of this invention and the improved properties of the polyamide composition prepared thereby and do not represent any limitations on the scope of the invention.

COMPARATIVE EXAMPLE A

Molten polyhexamethylene adipamide having an RV of 17 was prepared by concentrating an aqueous salt solution and then partially polymerizing the reactants in the concentrated solution in a reactor, flasher and prefinisher as described hereinbefore. Containing no phosphorous compound and no other additive that affected the RV of the polymer substantially, the molten polyamide was fed to a finisher of a conventional horizontal screw-conveyor type at a temperature of 278° C. and a rate of 50 pounds per hour. The screw-conveyor was operated to move the polymer through the partially-filled finisher with a residence time of 48 minutes. The pressure in the vapor space above the polymer in the finisher was maintained at 2 inches of water above atmospheric pressure. The polymer in the finisher was heated so that its exit temperature was 283° C. The polymer was not swept or otherwise contacted with inert gas in the finisher. The RV of the polymer leaving the finisher was 46.

COMPARATIVE EXAMPLE B

When the procedure of Example A was repeated with the exception that the polymer entering the finisher contained 0.064 weight percent phenylphosphinic acid

the RV of the polymer leaving the finisher was 49.

COMPARATIVE EXAMPLE C

When the procedure of Example A was repeated with the exception that the polymer in the finisher was continuously swept with 0.2 s.c.f. of inert gas (80% nitrogen and 20% carbon dioxide preheated to 285° C.) per pound of polymer, the RV of the polymer leaving the finisher was 57.6.

EXAMPLE I

When the procedure of Example C was repeated with the exception that the polymer entering the finisher contained 0.064 weight percent phenylphosphinic acid, the RV of the polymer leaving the finisher was 77.6, demonstrating that the combined use of the phosphorous compound and inert gas provided a greater RV increase (31.6 units) than the sum of the RV increases that were provided by separate use of the same amount of phosphorous compound (3 units) and the same amount of inert gas per pound of polymer (11.6 units). In other words, the RV increase obtained by combined use of the phosphorous compound and inert gas was over two times the increase that would have been expected from their separate use.

COMPARATIVE EXAMPLE D

When the procedure of Example A was repeated on an expanded scale utilizing a larger finisher for processing of 2000 pounds per hour of polyhexamethylene adipamide having an initial RV of 7 with a residence time of 40 minutes in the finisher, the RV of the polymer leaving the finisher was 47.5.

COMPARATIVE EXAMPLE E

When the procedure of Example D was repeated with the exception that the polymer entering the finisher contained 0.056 weight percent phenylphosphinic acid, the RV of the polymer leaving the finisher was 52.5.

COMPARATIVE EXAMPLE F

When the procedure of Example D was repeated with the exception that the polymer in the finisher was continuously swept with 0.233 s.c.f. of inert gas (80% nitrogen and 20% carbon dioxide preheated to 285° C.) per pound of polymer, the RV of the polymer leaving the finisher was 49.

EXAMPLE II

When the procedure of Example F was repeated with the exception that the polymer entering the finisher contained 0.056 weight percent phenylphosphinic acid, the RV of the polymer leaving the finisher was 58, demonstrating that the combined use of the phosphorous compound and inert gas provided a greater RV increase (10.5 units) than the sum of the RV increases that were provided by separate use of the same amount of phosphorous compound (5 units) and the same amount of inert gas per pound of polymer (1.5 units). In other words, the RV increase obtained by combined use of the phosphorous compound and inert gas was over 1.5 times the increase that would have been expected from their separate use.

COMPARATIVE EXAMPLE G

The procedure of Example A was duplicated with the exception that the temperature, pressure and residence time in the finisher were 285° C., one atmosphere and one hour, respectively, and the polymer in the finisher was continuously and countercurrently swept with 2.2 s.c.f. of inert gas (nitrogen preheated to about 285° C.) per pound of polymer. The polymer entering the finisher contained no additives other than 80 p.p.m. copper as cupric acetate, 375 p.p.m. potassium as potassium iodide and one percent by weight of a mixture of 87–91 weight percent N-ethyl o- and p-toluene sulfonamide and 9–13 weight percent o- and p-toluene sulfonamide. The additives in the polymer did not affect the polymer RV substantially. The COOH/NH$_2$ end group ratio of the polymer entering the finisher was 1:2. The RV of the polymer leaving the finisher was about 75. Properties of yarn (840 denier, 140 filaments) that was melt spun from the polymer leaving the finisher and cord made from the yarn are set forth in the table following Example III.

EXAMPLE III

When the procedure of Example G was repeated with the exception that the polymer entering the finisher contained 0.055 weight percent phenylphosphinic acid and the inert gas rate was lowered to 0.251 standard cubic feet per pound of polymer, the RV of the polymer leaving the finisher was about 75, demonstrating that the presence of the phosphorous compound decreased by about eight-ninths the amount of inert gas required to obtain a polymeric product having an RV equivalent to that of the Example G product. Properties of yarn and cord that were made from the polymeric product and tested as in Example G are set forth in the following table. Tires reinforced with cord made from the polymeric product of this example were found to have aobut 20 percent greater durability than tires similarly reinforced with cord prepared from the polymeric product of Example G.

YARN AND CORD PROPERTIES

|  | No phosphorous compound (comparative Example G) | Phenylphosphinic acid included (Example III) |
|---|---|---|
| Yarn: |  |  |
| Tenacity, grams/denier | 9.10 | 9.92 |
| Break elongation, percent | 15.30 | 14.60 |
| Cord: |  |  |
| Tenacity, grams/denier | 8.26 | 8.91 |
| Break elongation, percent | 18.20 | 19.00 |
| Growth, percent | 5.60 | 7.00 |
| Impact, gm. cm./den. cm | 0.46 | 0.53 |

EXAMPLE IV

An aqueous solution containing 37 weight percent hexamethylene diammonium phenylphosphinate was prepared by gradually adding 75 weight percent aqueous hexamethylene diamine to an aqueous solution containing 50 weight percent phenylphosphinic acid until the pH of the mixture reached 6.2. 511 pounds of an aqueous solution containing 49 weight percent hexamethylene diammonium adipate was then charged to a stainless steel evaporator together with enough of the hexamethylene diammonium phenylphosphinate solution to include about 0.068 weight percent phenylphosphinic acid based on the weight of the ultimate polymeric product. The contents of the evaporator were then heated to evaporate sufficient water to raise the concentration of hexamethylene diammonium adipate to about 75 percent. The concentrated batch was then charged at 150° C. to a stainless steel autoclave adapted for batch polymerization. The autoclave was pressurized to 75 p.s.i.g. with inert gas (80% nitrogen and 20% carbon dioxide) and its contents were then heated to 220° C. and 250 p.s.i.g. over a period of 35 minutes and then held at those conditions for 34 minutes more after which the autoclave temperature was raised to 246° C. Vapor was thereafter bled off to reduce the autoclave pressure to one atmosphere over a period of 60 minutes. During the pressure reduction, the autoclave temperature was gradually increased to 266° C. to drive off substantially all free water from the mixture. The partially polymerized polyamide was then extruded in ribbon form onto a casting wheel where it was quenched with water. The resulting solid ribbon was cut into flakes or chips suitable for melt-spinning with the use of a heated grid-melting apparatus. The RV of the flake was 36. Thereafter, the flake was melted in a conventional grid spinning apparatus to form a mechanically agitated pool of molten polyamide having a depth of three inches. The polymer was heated to 296° C. and maintained at that temperature for 20 minutes while 0.025 standard cubic feet of inert gas (80% nitrogen and 20% carbon dioxide preheated to about 295° C.) per pound of polymer was bubbled or sparged upwardly through it. Filaments produced by conventional melt-spinning of the resulting polymer had an RV of 50.2.

EXAMPLE V

When the procedure of Example IV was repeated with the exception that the inert gas rate was increased to 0.125 standard cubic feet per pound of polymer, the filament RV was 58.

Although the invention has been described herein with preferred embodiments, many modifications and variations thereof may be employed without departing from the spirit and scope of the invention. Accordingly, it is to be understood that the invention is not limited to such specific embodiments except as it is defined in the appended claims.

I claim:
1. A process which comprises sweeping molten fiber-forming polyamide containing between about 0.001 and about 3 weight percent of a phosphorous compound having the formula

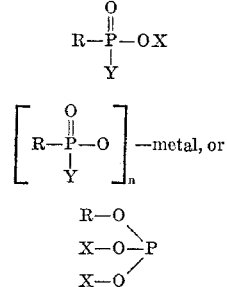

wherein
R is alkyl, cycloalkyl, aryl or arylalkyl,
Y is hydrogen, alkyl, cycloalkyl, aryl, arylalkyl or —OX,
X is hydrogen, alkyl, cycloalkyl, aryl or arylalkyl, and
n is a whole number corresponding to the valence of the metal with from about 0.02 to about 2 standard cubic feet of inert gas per pound of the polyamide.

2. A process as defined in claim 1, in which the molten polyamide contains between about 0.005 and about 0.5 weight percent of said phosphorous compound.

3. A process as defined in claim 1, in which the phosphorous compound is phenylphosphinic acid, diphenylphosphinic acid or triphenylphosphite.

4. A process as defined in claim 1, in which the molten polyamide is swept with inert gas for between about 0.1 and about 1.5 hours.

5. A process as defined in claim 1, in which the inert gas contains nitrogen.

6. A process as defined in claim 1, in which the molten polyamide is polyhexamethylene adipamide.

7. A process as defined in claim 6, in which the molten polyhexamethylene adipamide is swept with the inert gas at a temperature between about 260° and about 300° C.

8. A process as defined in claim 1, in which the molten polyamide contains between about 0.05 and 0.2 weight percent of said phosphorous compound and is swept with from about 0.1 to about 0.5 standard cubic feet of inert gas per pound of polyamide.

References Cited

UNITED STATES PATENTS

| 2,493,597 | 1/1950 | Rothrock et al. | 260—78 |
| 2,510,777 | 6/1950 | Gray | 260—78 |
| 2,927,841 | 3/1960 | Ben | 260—78 |
| 3,300,448 | 1/1967 | Gauthier et al. | 260—78 |
| 3,235,534 | 2/1966 | Brinkman et al. | 260—78 |

HAROLD D. ANDERSON, Primary Examiner

U.S. Cl. X.R.

260—45.7, 96; 57—140; 152—330; 117—161